C. P. HANSEN.
DRAFT DEVICE.
APPLICATION FILED APR. 9, 1908.
941,920.
Patented Nov. 30, 1909.
2 SHEETS—SHEET 2.
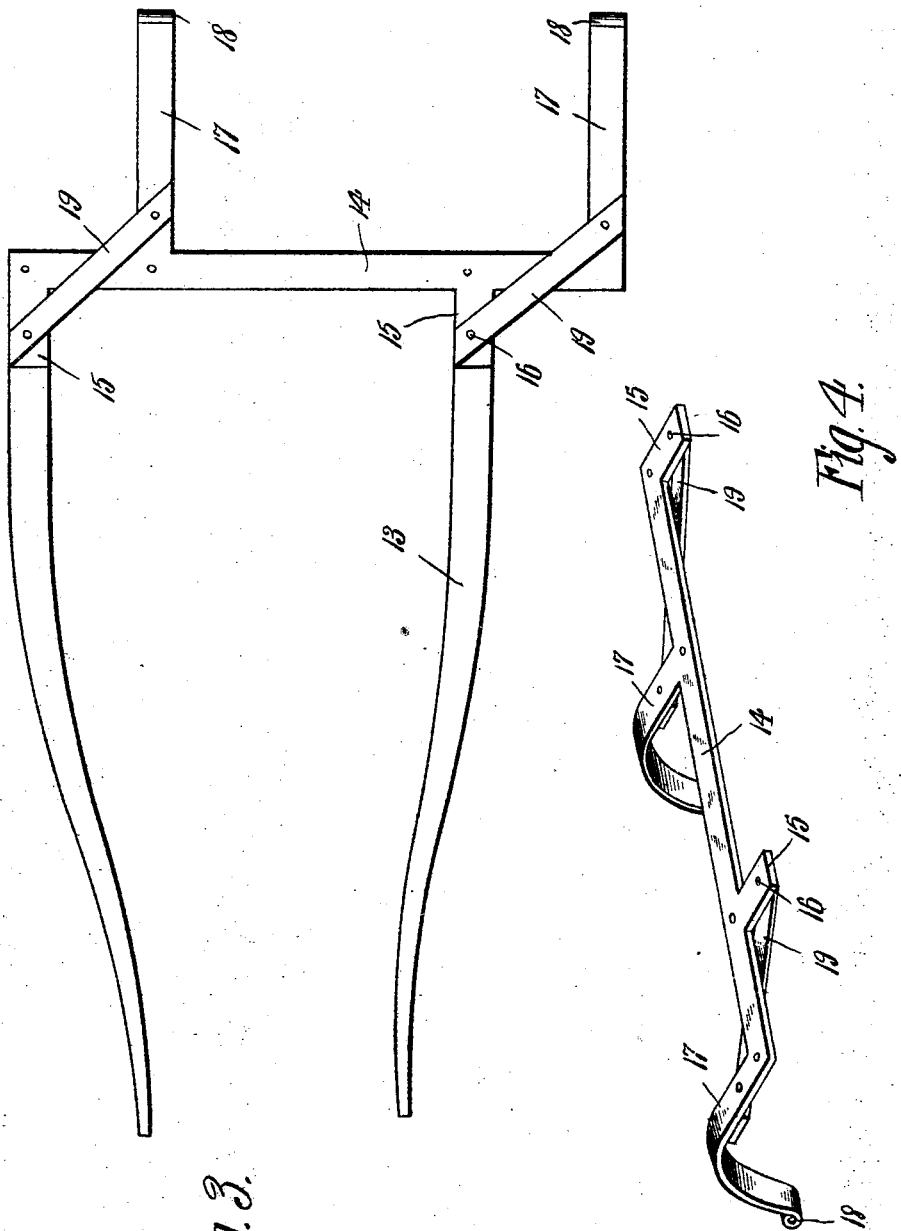
Witnesses
J. H. Crawford
F. G. Smith
Inventor
Charles P. Hansen,
Attorneys

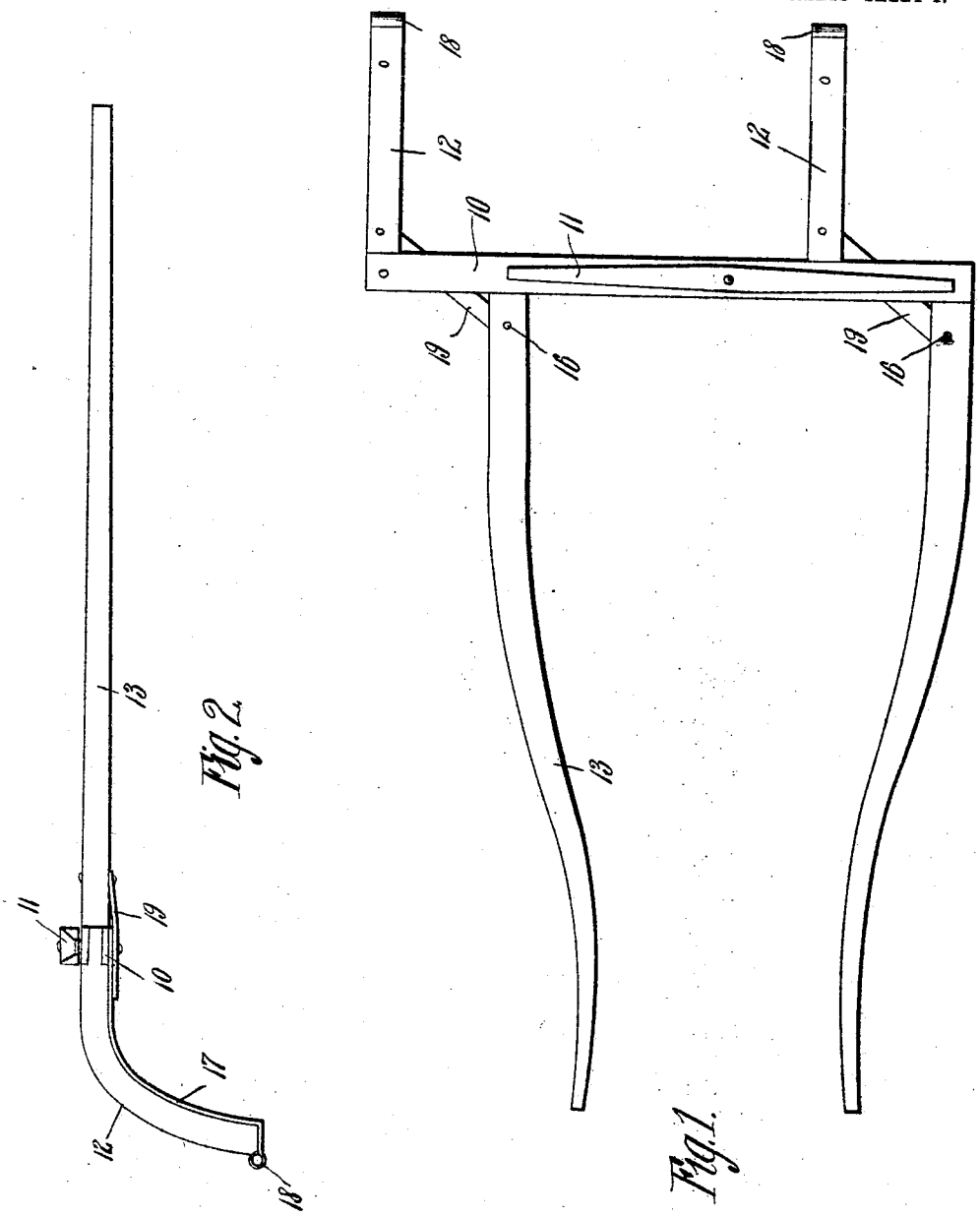

UNITED STATES PATENT OFFICE.

CHARLES P. HANSEN, OF EVAN, MINNESOTA.

DRAFT DEVICE.

941,920.

Specification of Letters Patent. Patented Nov. 30, 1909.

Application filed April 9, 1908. Serial No. 426,088.

*To all whom it may concern:*

Be it known that I, CHARLES P. HANSEN, a citizen of the United States, residing at Evan, in the county of Brown, State of Minnesota, have invented certain new and useful Improvements in Draft Devices; and I do hereby declare the following to be a full, clear, and exact description of the invention, such as will enable others skilled in the art to which it appertains to make and use the same.

This invention relates to draft devices for buggies and other light vehicles and more particularly to that class of draft devices which include thills which are offset with respect to the vehicle. I have found in such constructions that considerable lateral strain is exerted upon the thills and the cross bar to which they are secured and I therefore have in view, in carrying out my invention, the provision of means for counteracting this lateral strain and for otherwise strengthening the structure.

In the accompanying drawings, Figure 1 is a top plan view of the invention, Fig. 2 is a side elevation thereof, Fig. 3 is a bottom plan view, and, Fig. 4 is a detail perspective view of the strengthening structure removed from the thills, the thill bows, and the cross bar.

As shown in the drawings, the draft device comprises a cross bar 10 upon which is mounted the usual whiffle-tree 11 and secured at their forward ends to the cross bar and projecting rearwardly and curved downwardly therefrom are thill bows 12, the connection of the bows with the cross bar being had by mortising the cross bar at one end and adjacent the other end and forming the said forward ends of the bows with tenons which are fitted in the mortises.

The thills proper are indicated by the numeral 13 and they are secured in the same manner at their rear ends to the cross bar 10, they being however offset to the left hand side with respect to the thill bows as clearly shown in the top plan and bottom plan views of the drawings. Owing to the fact that the thills are offset with respect to their bows, it will be readily appreciated that in actual use, considerable lateral strain will be exerted upon the thills and in fact upon the entire device and especially at the points of connection of the thills and the bows with the cross bar, and in order to strengthen the device and overcome any such strain, I have provided means which will now be described.

The strengthening means above referred to is in the form of a frame and braces which are associated with the frame, and the frame comprises a portion 14 which is bolted or otherwise secured, preferably by the same bolts which pass through the tenons of the thills and their bows, upon the under side of the cross bar 10. Formed integral with the forward edge of this portion 14 are extensions 15 which are two in number, one extension extending beneath each of the thills 13 at the rear ends thereof and being bolted thereto by means of bolts 16. At its rear edge, the portion 14 is formed with extensions 17 which extend rearwardly and thence downwardly against the under side of the thill bows 12 and at their lower ends are bent as at 18 to form thill eyes which are of course received between the spaced ears of the thill coupling of the axle-tree of the vehicle in connection with which the draft device is used.

The braces mentioned above are indicated by the numeral 19 and these braces are in the form of flat bars and are two in number one connecting each of the thill bows and the corresponding thill. Each of the braces 19 is secured at its rear end to the under side of the corresponding thill bow 12 and is thence directed diagonally forward and secured at its forward end by means of the bolts 16, to the under side of the corresponding thill 13. It will thus be seen that both of the braces extend in the same direction and in fact they are parallel with respect to each other and effectually counteract any lateral strain which is exerted upon the device.

What is claimed, is:—

A draft device comprising a cross bar, thill bows secured to the cross bar, thills secured to the cross bar out of alinement with respect to the bows, a strengthening frame comprising a cross bar which extends beneath and is secured to the underside of the first mentioned cross bar, forward extensions formed integral with the cross bar of the strengthening frame and secured to the underside of the thills at their rear end, rearward extensions formed integral with said cross bar of the strengthening frame and secured to the underside of the bows, said rearward extensions having at their lower ends thill eyes, and a diagonal brace connected at one end to each of the rearward extensions behind the cross bar of the strengthening frame and at the other end each being connected to the respective forward extension of the strengthening frame.

In testimony whereof, I affix my signature, in presence of two witnesses.

CHARLES P. HANSEN.

Witnesses:
L. A. ZELLMER,
W. H. HARTMAN.